United States Patent
Lertrattanapanich et al.

(10) Patent No.: US 7,403,234 B2
(45) Date of Patent: Jul. 22, 2008

(54) METHOD FOR DETECTING BISECTION PATTERN IN DEINTERLACING

(75) Inventors: Surapong Lertrattanapanich, Santa Ana, CA (US); Yeong-Taeg Kim, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 625 days.

(21) Appl. No.: 11/121,815

(22) Filed: May 2, 2005

(65) Prior Publication Data

US 2006/0244861 A1    Nov. 2, 2006

(51) Int. Cl.
*H04N 7/01* (2006.01)
*H04N 11/20* (2006.01)

(52) U.S. Cl. .................. 348/448; 348/458; 382/194

(58) Field of Classification Search .......... 348/448, 348/458, 441, 449, 625; 382/192, 194, 199
See application file for complete search history.

(56) References Cited

U.S. PATENT DOCUMENTS

| | | | | |
|---|---|---|---|---|
| 5,519,451 A | * | 5/1996 | Clatanoff et al. | 348/606 |
| 5,579,053 A | * | 11/1996 | Pandel | 348/448 |
| 5,638,139 A | * | 6/1997 | Clatanoff et al. | 348/701 |
| 6,924,844 B2 | * | 8/2005 | Kawamura et al. | 348/448 |
| 2003/0076447 A1 | | 4/2003 | Wang | 382/199 |

OTHER PUBLICATIONS

G. De Haan and E.B. Bellers, *Deinterlacing—An Overview*, Proceedings of the IEEE, Sep. 1998, pp. 1839-1857, vol. 86, No. 9.
M.K. Park, et al., *New Edge Dependent Deinterlacing Algorithm Based on Horizontal Edge Pattern*, IEEE Transactions on Consumer Electronics, Nov. 2003, pp. 1508-1512, vol. 49, No. 4.

* cited by examiner

*Primary Examiner*—M. Lee
(74) *Attorney, Agent, or Firm*—Kenneth L. Sherman, Esq.; Michael Zarrabian, Esq.; Myers Dawes Andras & Sherman, LLP (57) ABSTRACT

A method for detecting the Bisection pattern for use in conjunction with the deinterlacing is to improve low angle direction detection capability. A method of Bisection pattern detection operates in an interlaced video containing both top and bottom fields. For each missing pixel in a current input field, a window W is constructed whose center pixel is at the considered missing pixel. A binary map is generated which includes rows of values corresponding to pixels in the window, wherein the values indicate if each element of the window is greater than the sample mean of the area surrounding the missing pixel. The number of value changes in the values in each row of the binary map is counted. It is then determined whether or not the missing pixel is within the Bisection pattern based on said counts. In order to maintain both the low angle edge direction detection capability and low misdetection probability, complicated areas are identified by the Bisection pattern detection method. Then deinterlacing is performed.

39 Claims, 6 Drawing Sheets

METHOD FOR DETECTING BISECTION PATTERN IN DEINTERLACING

FIELD OF THE INVENTION

The present invention relates to the field of image processing, and more particularly, to the application of Bisection detection algorithm in conjunction with edge direction detection for video deinterlacing in order to improve the misdetection probability of the low angle direction.

BACKGROUND OF THE INVENTION

Due to the recent advances of digital television (DTV), deinterlacing plays an important role in standard conversion between interlaced and progressive video scanning formats. For an image display of size M×N, where M and N denote the number of scan lines and number of pixels in each scan line, respectively, in an interlaced video scanning format, the picture formed by the stack of all even scan line m=0, 2, 4, . . . , M−2 is called top field (or even field). Each even scan line of the top field is called existing scan line while its odd counterpart whose pixels do not exist is called missing scan line. In a similar fashion, the bottom field (or odd field) is formed by the stack of all odd scan lines m=1, 3, . . . , M−1 which are the existing scan lines in this case. These two fields are displayed in an alternating manner at different time instants to form a complete image on the display.

Figure 3:
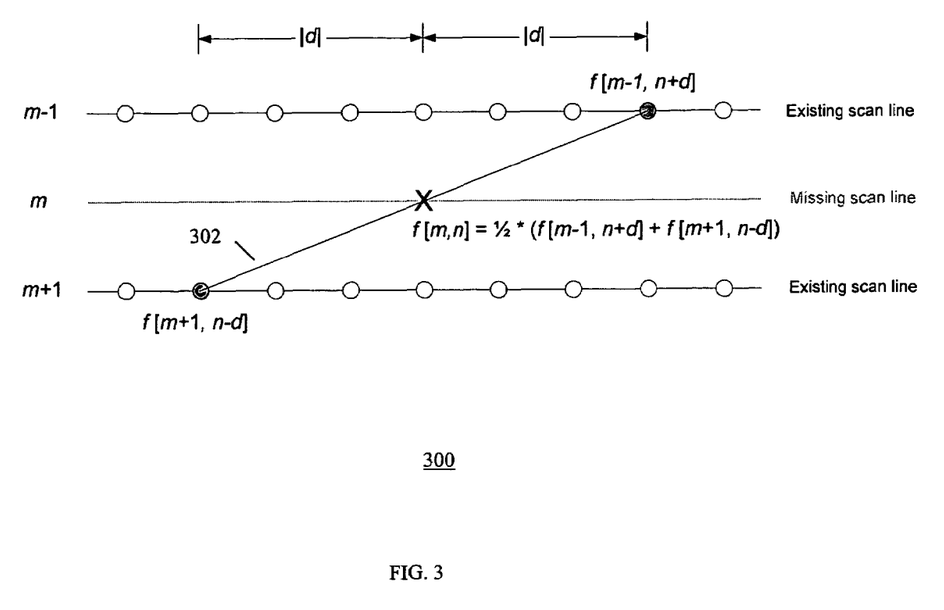
FIG. 3 is a drawing illustrating example calculation of linear directional interpolation of the missing pixel ƒ[m,n], according to an embodiment of the present invention.

The object of deinterlacing is to convert each M/2×N field (either top or bottom field) to a complete M×N image by interpolating each pixel in the missing scan lines from its neighboring (above and below) existing scan lines. Let d (in pixel unit) denote the detected direction obtained by the edge direction detection process. Referring to the example in FIG. 3, an interpolation of the missing pixel ƒ[m,n] in the current field f (e.g., field 300) can be calculated by the simple directional linear interpolation 302 which can be expressed as:

$$f[m, n] = \frac{1}{2}(f[m-1, n+d] + f[m+1, n-d]) \quad (1)$$

where m is the scan line number of the missing pixel, and n is the pixel number in the missing scan line.

Figure 5A:
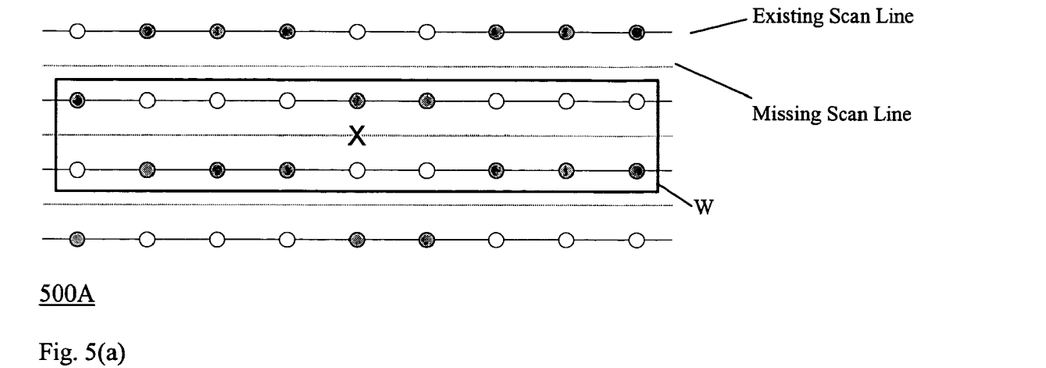
Figure 5B:
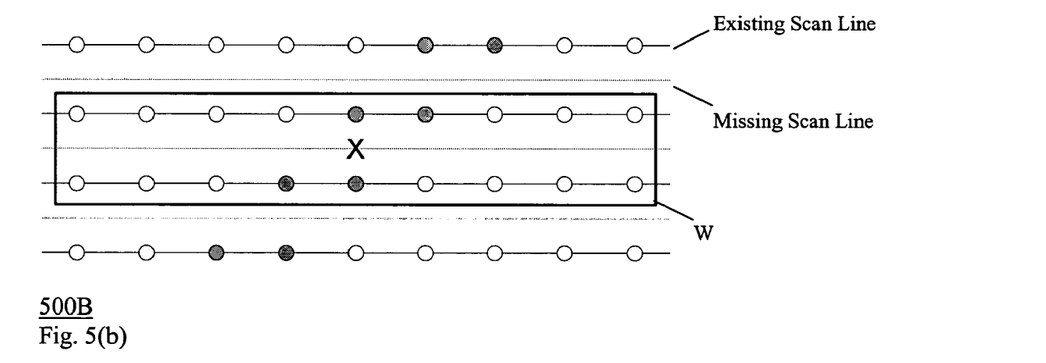

In deinterlacing, conventional edge direction detection techniques typically misdetect when direction |d| is large (the very low angle direction). For example, in FIG. 5(*b*), the edge direction detector may detect the direction d=−3 (or less, i.e. −4, −5, . . . , depending on the chosen vector length in edge direction detector) even though the more suitable direction should be d=½ or 0 (vertical direction).

SUMMARY OF THE INVENTION

The present invention addresses the above shortcomings. An object of the present invention is to provide a method for detecting the Bisection pattern for use in conjunction with the deinterlacing to improve low angle direction detection capability.

A method for detecting the Bisection pattern for use in conjunction with the deinterlacing is to improve low angle direction detection capability. A method of Bisection pattern detection operates in an interlaced video. For each missing pixel in a current input field, a window W is constructed whose center pixel is at the considered missing pixel. A binary map is generated which includes rows of values corresponding to pixels in the window, wherein the values indicate if each element of the window is greater than the sample mean of the area surrounding the missing pixel. The number of value changes in the values in each row of the binary map is counted. It is then determined whether or not the missing pixel is within the Bisection pattern based on said counts (there are two sets of value change counts corresponding to two rows). In order to maintain both the low angle edge direction detection capability and low misdetection probability, complicated areas are identified by the Bisection pattern detection method. Then deinterlacing is performed.

In one example according to the present invention, a method of deinterlacing with Bisection pattern detection for an interlaced field f of pixels, comprising the steps of: (a) for each considered missing pixel of the current input field f, detecting a direction d; (b) performing Bisection pattern detection to determine a Bisection pattern decision β; (c) determining a refined detected direction d' by multiplying the Bisection pattern decision β with the detected direction d; and (d) interpolating the missing pixel by directional interpolation based on the refined detected direction d'.

Other embodiments, features and advantages of the present invention will be apparent from the following specification taken in conjunction with the following drawings.

BRIEF DESCRIPTION OF THE DRAWINGS

FIGS. 5(*a*) and (*b*) are drawings illustrating windows containing complicated patterns (not classified as Bisection patterns) due to texture in FIG. 5(*a*), and due to thin line (foreground) in uniform background in FIG. 5(*b*)

DETAILED DESCRIPTION OF THE INVENTION

Figure 4:
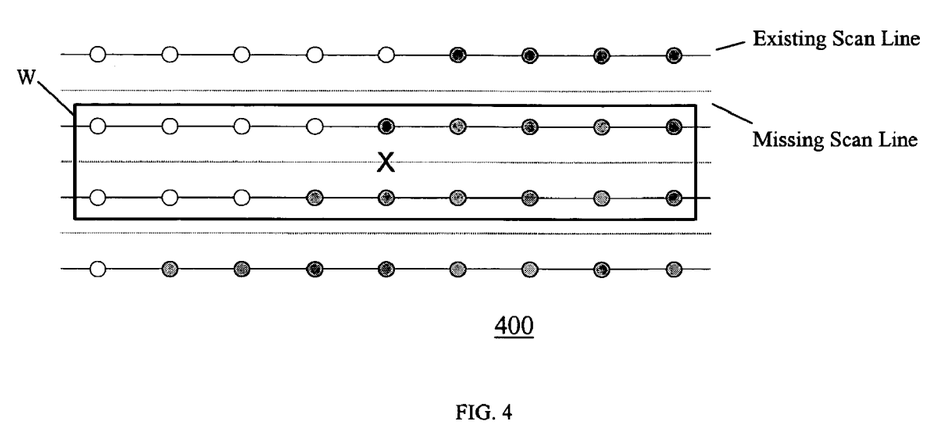
FIG. 4 is a drawing illustrating an example of the Bisection pattern within the window specified by rectangular, according to an embodiment of the present invention.

In one embodiment, the present invention applies Bisection pattern detection in conjunction with deinterlacing. The general idea of the Bisection pattern is briefly discussed while its strict definition will be later delineated mathematically in the detailed description of the preferred embodiment section. Conceptually, the pattern of a collection of pixels within some window (or area) is called Bisection pattern if those pixels can be clearly separated into two regions (or sections): (1) a region containing pixels whose gray levels are greater than a sample mean in that area, and (2) a region containing pixels whose gray levels are not greater than a sample mean in that area. The areas containing Bisection patterns are very well-structured areas and are considered uncomplicated areas. An example of the Bisection pattern within a specified window is shown in FIG. 4. In FIG. 4, an example of the Bisection pattern within a window W is provided. FIG. 4 shows a portion of field 400 containing alternating order of existing scan line and missing line. The missing pixels between the two neighboring existing scan lines immediately above and below the considered missing pixel denoted by the symbol x. The window W contains the samples confined within a rectangle whose center is at the considered missing pixel denoted by the symbol x. It is noted that the collection of pixels within the window W is clearly separated into two regions: (1) white region (hollow circles ◯), and (2) shaded region (filled circles ●).

By contrast, the areas which do not contain Bisection patterns are considered as complicated areas. Examples of the areas not containing Bisection pattern are such as texture and thin line (foreground) in the uniform background are shown in FIGS. 5(a) and 5(b). In the portion of 500A in FIG. 5(a), an example of the complicated pattern within the window W specified by a rectangle is provided. It is noted that the collection of pixels within the window cannot be clearly separated into two regions. This type of complicated pattern usually is due to texture area. Also, the small fluctuation in uniform area caused by an additive noise can also be classified into this type of complicated pattern.

In the portion of field 500B in FIG. 5(b), an example of the complicated pattern within the window specified by rectangular is provided. It is noted that the collection of pixels within the window W is partitioned into three regions: (1) white region on the left hand side, (2) shaded region in the middle, and (3) another white region on the right hand side. Since white regions (1) and (3) do not merge within window W, this pattern cannot be considered as Bisection. This type of complicated pattern usually is due to the thin line (or foreground) in the uniform background. In deinterlacing, the direction associated with this pattern is quite difficult to detect because the edge direction detector could classified the current missing pixel as part of either the shaded foreground or the white background depending on the search strategy. Therefore, the direction corresponding to this type of complicated pattern should be set to vertical direction.

An example Bisection pattern detection according to the present invention includes the steps of: (a) for each missing pixel in the current input field, constructing the 2×(2K+1) window whose center pixel is at the considered missing pixel, for some integer K≧0; (b) generating the binary map by determining whether or not each element of window is greater than the sample mean calculated from the area surrounding the considered missing pixel; (c) calculating the numbers of value changes by counting the number of changes from 0 to 1 or vice versa in each row of binary map as in step (b); and (d) determining whether or not the missing pixel is within the Bisection pattern using the number of value changes in step (c). One example of value change is a sign change.

Figure 1:
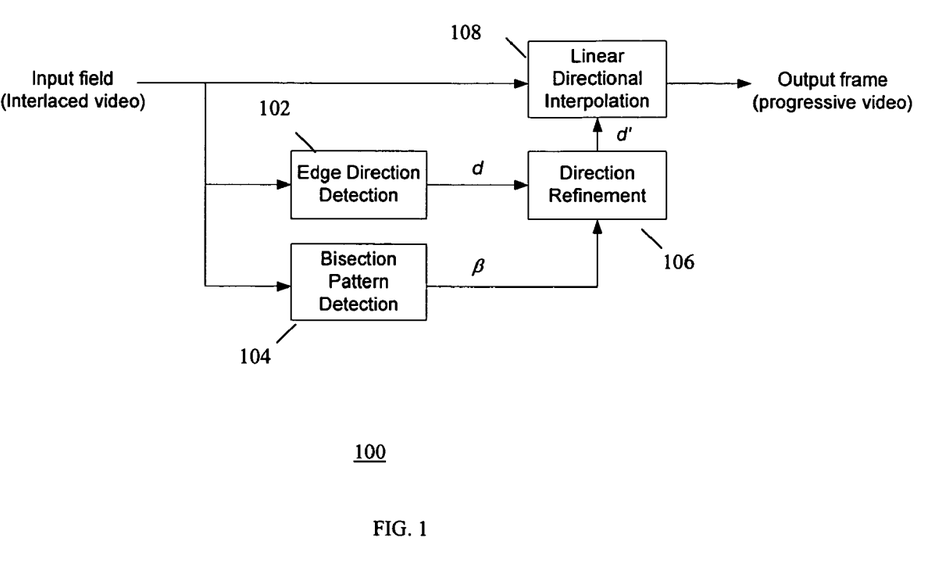
FIG. 1 shows a block diagram of a system implementing Bisection pattern detection in conjunction with generic deinterlacing according to an embodiment of the present invention.

FIG. 1 shows a block diagram of an embodiment of a system 100 according to the present invention which implements a Bisection pattern detection in conjunction with deinterlacing. Each sample in the missing scan lines of current input field is directional linear interpolated based on the product between detected direction/angle d and the Bisection pattern decision β which is a binary number. In the example in FIG. 1, a current field f (which could be either top or bottom field) is input to edge direction detector 102 wherein the direction d is detected. In parallel, the current field f is input to the Bisection pattern detector 104 to obtain the binary Bisection pattern decision β. Then, the Bisection pattern decision β is further used in the direction refiner 106 to refine the potential misdetected direction d prior to the linear directional interpolator 108. The refined detected direction d' from the refiner 106 is obtained by relation:

$$d' \begin{cases} d & \text{if } \beta = 1; \\ \text{vertical direction} & \text{if } \beta = 0. \end{cases} \quad (2)$$

The refined detected direction d' is input to the linear directional interpolator 108 along with the input field, where associated calculation is performed according to relation (1) above as shown by example in FIG. 3, which illustrates the calculation of linear directional interpolation of the missing pixel $f[m,n]$ from two existing pixels $f[m-1,n+d]$ and $f[m+1,n-d]$ of above and below neighboring existing scan lines, where the detected direction is d pixel(s). It is noted that the detected direction d used here could be either positive or negative.

After each missing pixel in the current field is linear directional interpolated using its associated refined detected direction d', the resulting output is a complete image or frame (instead of field) corresponding to its current input field.

Figure 2:
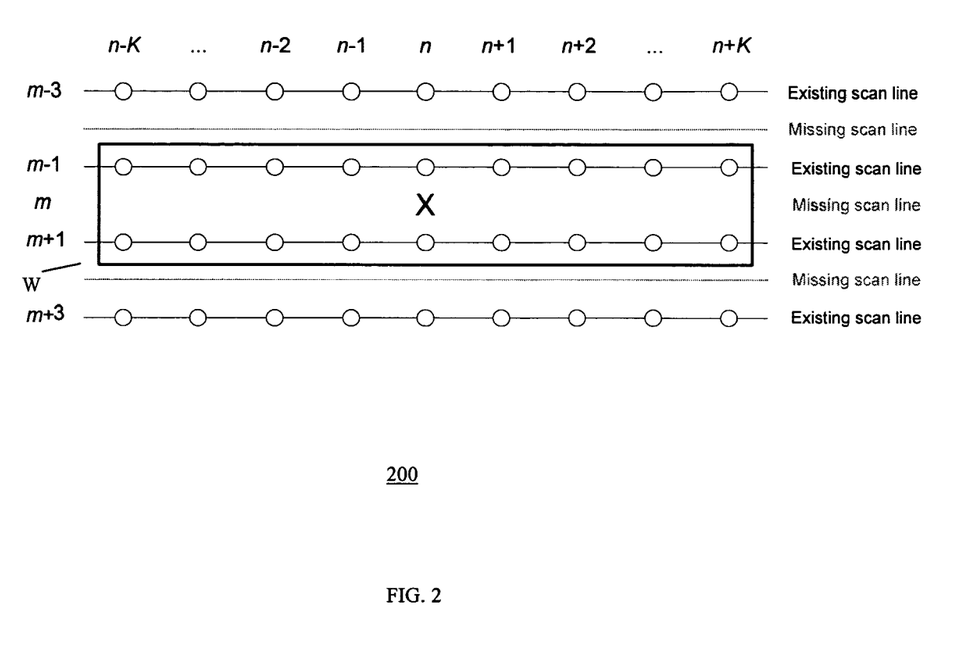
FIG. 2 is a drawing illustrating a window of size 2×(2K+1) whose center is at the considered missing sample denoted by the symbol x.

FIG. 2 illustrates a portion of field 200 and window W of size 2×(2K+1) containing the samples confined within a rectangle whose center is at the considered missing pixel denoted by the symbol x, for some K≧0. The existing pixels denoted by the symbol [603] in the window belong to the two neighboring existing scan lines immediately above and below the considered missing pixel. The samples in the window belong to the two neighboring existing scan lines immediately above and below the considered sample. If any pixel in the window is out of the image boundary, according to the present invention the replicate image boundary condition is used. The application of such window to deinterlacing is discussed further below in conjunction with FIG. 6.

Figure 6:
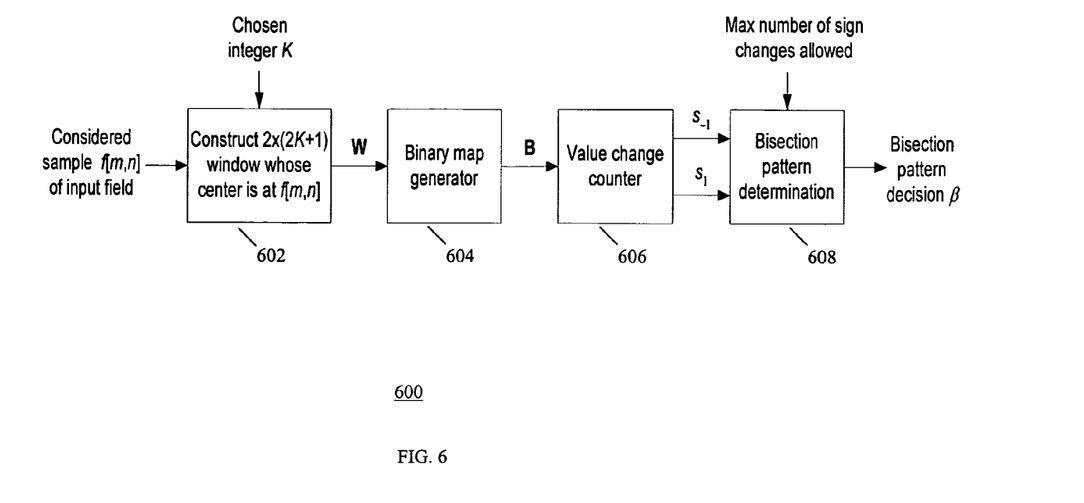
FIG. 6 is a block diagram of an example system that implements Bisection pattern detection according to an embodiment of the present invention.

FIG. 6 shows a block diagram of an example system 600 according to the present invention which implements a Bisection pattern detection algorithm. In this algorithm, there are two parameters: (1) integer K≧0; and (2) maximum number of value changes allowed. The input is each (to-be-interpolated) sample f[m, n] in the missing scan line of the input field while the output is the decision on the area surrounding the considered missing sample whether or not it is Bisection pattern. In FIG. 6, for each considered missing pixel $f[m,n]$ of the current input field, the 2×(2K+1) window W is constructed for some K≧0 by a window constructor 602. As such, the window W is formed by the stack of the subsets of samples in the above existing scan line $\rho_{-1}$, and below existing scan line $\rho_1$ with respect to the considered missing pixel, wherein:

$$W = \begin{bmatrix} \rho_{-1} \\ \rho_1 \end{bmatrix}, \quad (3)$$

where $\rho_i = \{\rho_i[j] = f[m+i, n+j] : -K \leq j \leq K\}$.

For arbitrary Boolean variable A∈{TRUE,FALSE}, the predicate function Pred is defined as:

$$Pred(A) = \begin{cases} 1 & \text{if } A = \text{TRUE}; \\ 0 & \text{if } A = \text{FALSE.} \end{cases} \quad (4)$$

After the window W is constructed in accordance with relation (3), each element of the window W is determined in a binary map generator 604, whether or not that element is greater than the sample mean $\overline{W}$ calculated from the neighboring samples of the considered missing pixels. Then, the resulting comparison is assigned to a corresponding element in binary map B. Specifically, the binary map B can be expressed as:

$$B = \begin{bmatrix} b_{-1} \\ b_1 \end{bmatrix}, \quad (5)$$

where $b_i = \{b_i[j] = Pred(\rho_i[j] > \overline{W}) : -K \le j \le K\}$.

The sample mean $\overline{W}$ is calculated as:

$$\overline{W} = \frac{1}{4(2K+1)} \sum_{i \in \{-3,-1,1,3\}} \sum_{j=-K}^{K} f[m+i, n+j]. \quad (6)$$

After the binary map B is obtained, the number of value changes $s_{-1}$, and $s_1$, of elements in binary vectors $b_{-1}$, and $b_1$, are computed by a value change counter 606 as:

$$s_i = \sum_{j=-K}^{K-1} |b_i[j] - b_i[j+1]|, \text{ for } i = -1 \text{ and } 1. \quad (7)$$

Thereafter, the Bisection pattern determinator 608 determines the Bisection pattern decision β. Let S denote the maximum number of value changes allowed. Then, the pattern of pixels within the window W is called Bisection if and only if the Bisection pattern decision β of window W equals one, where β is defined as:

$$\beta = Pred(s_{-1} \le S \text{ AND } s_1 \le S). \quad (8)$$

As such, if both numbers of value changes, $s_{-1}$ and $s_1$, are less than or equal to the maximum number of value changes allowed S, the considered missing pixel is classified to be in the Bisection pattern and the Bisection pattern decision β is set to 1; otherwise, β is set to 0.

Other values for S can be used, however, based on extensive simulation, the maximum number of value change S allowed is set to 1 and the integer K is chosen to be 4 (so that width of the window W is 2K+1=9).

The directional linear interpolation could be replaced with a more advanced interpolation such as cubic spline interpolation which requires 4 existing pixels: $f[m-3,n+3d]$, $f[m-1,n+d]$, $f[m+1,n-d]$, and $f[m+3,n-3d]$) or higher order B-spline interpolations.

To lower the computation burden, the Bisection pattern detection can be implemented as a pre-processing step. For example, instead of detecting direction d and Bisection pattern decision β in parallel, the Bisection pattern decision β can be calculated first and its result used to determine whether edge direction detection should be performed or not. If β=0, the detected direction d is set to vertical direction without the implementation of edge direction detection; otherwise, the edge direction detection process is performed as usual.

Further, to double check the fidelity of refined detected direction d', the Bisection pattern detection can be used in the post-processing step. Instead of the fixed window width (e.g., 2K+1), the window width of the Bisection pattern detection in the post-processing step can be adaptive to the refined detected direction d'. Based on extensive simulation, the refined detected direction d' and its corresponding window width (2K+1) are provided in the following coordinates (d',  2K+1) as: (1, 3), (−1, 3), (2, 5), (−2, 5), (3, 7), (−3, 7), (4, 7), (−4, 7), (5, 7), (−5, 7), (6, 7), (−6, 7), (7, 7), (−7, 7), (8, 9), and (−8, 9).

As such, the present invention provides a method for detecting the Bisection pattern for use in conjunction with the deinterlacing to improve low angle direction detection capability. In edge direction detection process of deinterlacing, it is known that there is a trade-off between low angle direction detection capability and misdetection probability. That is, if the detected direction is detected as a very low angle direction, it is very likely to be an incorrect direction detection. Such misdetection usually occurs in the complicated areas such as texture and thin line (foreground) in the uniform background. In order to maintain both the low angle edge direction detection capability and low misdetection probability, those complicated areas must be identified first. Accordingly, the present invention provides a method and system for detecting the Bisection pattern which is inversely related to those complicated areas.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of deinterlacing with Bisection pattern detection for an input field f, comprising the steps of:
   (a) for each considered missing pixel of the current input field f, detecting a direction d;
   (b) performing Bisection pattern detection to determine a Bisection pattern decision β;
   (c) determining a refined detected direction d' by multiplying the Bisection pattern decision β with the detected direction d; and
   (d) interpolating the missing pixel by interpolation based on the refined detected direction d'.

2. The method of claim 1 further comprising repeating steps (a) through (d) until each missing pixel of the current input field is interpolated.

3. The method of claim 1, wherein the step of Bisection pattern detection further comprises the steps of:
   constructing a window W whose center pixel is at the considered missing pixel f[m,n];
   generating a binary map B including rows of values corresponding to pixels in the window, wherein the values indicate if each element of the window is greater than the sample mean of the area surrounding the missing pixel;
   counting the number of value changes in each row of the binary map; and
   determining a Bisection pattern decision β based on said counts.

4. The method of claim 3 wherein the step of constructing the window W further comprises the steps of constructing a 2×(2K+1) window W whose center pixel is at the considered missing pixel f[m,n].

5. The method of claim 4 wherein the step of constructing the window W further comprises the steps of determining the window W as:

$$W = \begin{bmatrix} \rho_{-1} \\ \rho_1 \end{bmatrix}, \text{ where } \rho_i = \{\rho_i[j] = f[m+i, n+j] : -K \le j \le K\}.$$

6. The method of claim 4 wherein the step of generating the binary map further includes the steps of generating the binary map B as:

$$B = \begin{bmatrix} b_{-1} \\ b_1 \end{bmatrix}, \text{ where } b_i = \{b_i[j] = Pred(\rho_i[j] > \overline{W}): -K \le j \le K\};$$

the sample mean $\overline{W}$ is calculated as:

$$\overline{W} = \frac{1}{4(2K+1)} \sum_{i \in \{-3,-1,1,3\}} \sum_{j=-K}^{K} f[m+i, n+j],$$

and $$Pred(A) = \begin{cases} 1 & \text{if } A = \text{TRUE;} \\ 0 & \text{if } A = \text{FALSE.} \end{cases}$$

7. The method of claim 6 wherein the step of counting the numbers of value changes $s_{-1}$ and $s_1$ further includes the steps of determining:

$$s_i = \sum_{j=-K}^{K-1} |b_i[j] - b_i[j+1]|,$$

for i=−1 and 1, where said counts are for the numbers of value changes $s_{-1}$ and $s_1$ of elements in binary vectors $b_{-1}$ and $b_1$ in the binary map B.

8. The method of claim 7 wherein the step of calculating the Bisection pattern decision β further comprises the steps of calculating:

β=Pred($s_{-1} \le S$ AND $s_1 \le S$), where S denotes the maximum number of value changes allowed.

9. The method of claim 1 wherein the step of interpolation further comprises the steps of performing directional interpolation.

10. The method of claim 1 wherein the step of interpolation further comprises the steps of performing spline interpolation based on cubic spline interpolation using 4 existing pixels: ƒ[m−3,n+3d], ƒ[m−1,n+d], ƒ[m+1,n−d], and ƒ[m+3,n−3d]).

11. The method of claim 1 wherein the step of interpolation further comprises the steps of performing interpolation by B-spline interpolation.

12. The method of claim 8 wherein the maximum number of value change S allowed is 1 and the integer K is selected to be 4 such that width of the window W is 2K+1=9.

13. The method of claim 1 wherein the step of Bisection pattern detection is performed before the step of detecting the direction d, wherein the Bisection pattern decision β is used to determine whether the edge direction detection should be performed or not.

14. The method of claim 13 wherein if β=0, the detected direction d is set to vertical direction without performing the step of edge direction detection; otherwise, the edge direction detection process is performed.

15. The method of claim 3 further comprising the step of determining the fidelity of refined detected direction d'.

16. The method of claim 15, wherein the step of determining the fidelity of refined detected direction d' further comprises the steps of performing Bisection pattern detection in a post-processing step.

17. The method of claim 16 wherein the window width of the Bisection pattern detection is adaptive to the refined detected direction d'.

18. The method of claim 17 wherein the step of constructing the window W further comprises the steps of constructing a 2×(2K+1) window W whose center pixel is at the considered missing pixel, where integer K≧0.

19. The method of claim 18 wherein the refined detected direction d' and its corresponding window width (2K+1) are (d', 2K+1) as: (1, 3), (−1, 3), (2, 5), (−2, 5), (3, 7), (−3, 7), (4, 7), (−4, 7), (5, 7), (−5, 7), (6, 7), (−6, 7), (7, 7), (−7, 7), (8, 9), and (−8, 9).

20. A method of Bisection pattern detection in an interlaced field of pixels, comprising the steps of:
(a) for each missing pixel in a current input field, constructing window W whose center pixel is at the considered missing pixel;
(b) generating a binary map including rows of values corresponding to pixels in the window, wherein the values indicate if each element of the window is greater than the sample mean of the area surrounding the missing pixel;
(c) counting the number of changes in the values in each row of the binary map; and
(d) determining whether or not the missing pixel is within the Bisection pattern based on said counts.

21. The method of claim 20, wherein the step of constructing the window W further includes the steps of, for each missing pixel in a current input field, constructing a 2×(2K+1) window W whose center pixel is at the considered missing pixel, where integer K≧0.

22. A video processing system for deinterlacing with Bisection pattern detection for an input field f, comprising:
(a) a direction detector that for each considered missing pixel of the current input field f, detects a direction d;
(b) a pattern detector that performs Bisection pattern detection to determine a Bisection pattern decision β;
(c) a direction refiner that determines a refined detected direction d' by multiplying the Bisection pattern decision β with the detected direction d; and
(d) an interpolator that interpolates the missing pixel by interpolation based on the refined detected direction d'.

23. The system of claim 22 wherein each missing pixel of the current input field is interpolated.

24. The system of claim 22 wherein the pattern detector further comprises:
a window constructor that constructs a window W whose center pixel is at the considered missing pixel f[m,n];
a binary map generator that generates a binary map B including rows of values corresponding to pixels in the window, wherein the values indicate if each element of the window is greater than the sample mean of the area surrounding the missing pixel;
a counter that counts the number of values changes in each row of the binary map; and
a pattern decision calculator that determining a Bisection pattern decision β based on said counts.

25. The system of claim 24 wherein the window constructor constructs a 2×(2K+1) window W whose center pixel is at the considered missing pixel f[m,n].

26. The system of claim 25 wherein the window constructs the window W as:

$$W = \begin{bmatrix} \rho_{-1} \\ \rho_1 \end{bmatrix}, \text{ where}$$

$$\rho_i = \{\rho_i[j] = f[m+i, n+j]: -K \le j \le K\}.$$

27. The system of claim 25 wherein the binary map generator generates the binary map B as:

$$B = \begin{bmatrix} b_{-1} \\ b_1 \end{bmatrix}, \text{ where}$$

$$b_i = \{b_i[j] = Pred(\rho_i[j] > \overline{W}): -K \le j \le K\};$$

the sample mean $\overline{W}$ is calculated as:

$$\overline{W} = \frac{1}{4(2K+1)} \sum_{i \in \{-3,-1,1,3\}} \sum_{j=-K}^{K} f[m+i, n+j],$$

and $$Pred(A) = \begin{cases} 1 & \text{if } A = \text{TRUE}; \\ 0 & \text{if } A = \text{FALSE}. \end{cases}$$

28. The system of claim 27 wherein the counter counts the numbers of value changes $s_{-1}$ and $s_1$ by determining:

$$s_i = \sum_{j=-K}^{K-1} |b_i[j] - b_i[j+1]|,$$

for i=−1 and 1, where said counts are for the numbers of value changes $s_{-1}$ and $s_1$, of elements in binary vectors $b_{-1}$ and $b_1$ in the binary map B.

29. The system of claim 28 wherein the pattern decision calculator calculates the Bisection pattern decision β as:

$$\beta = Pred(s_{-1} \le S \text{ AND } s_1 \le S),$$

wherein S denotes the maximum number of value changes allowed.

30. The system of claim 22 wherein the interpolator performs interpolation by directional interpolation.

31. The system of claim 22 wherein the interpolator comprises a cubic spline interpolator using 4 existing pixels: $f[m-3,n+3d]$, $f[m-1,n+d]$, $f[m+1,n-d]$, and $f[m+3,n-3d]$).

32. The system of claim 22 wherein interpolator comprises a B-spline interpolator.

33. The system of claim 29 wherein the maximum number of value change S allowed is 1 and the integer K is selected to be 4 such that width of the window W is 2K+1=9.

34. The system of claim 22 wherein the pattern detector performs said Bisection pattern diction before the direction detector detects the direction d, wherein the Bisection pattern decision β is used to determine whether the edge direction detection should be performed or not.

35. The system of claim 34 wherein if β=0, the detected direction d is set to vertical direction without edge direction detection, otherwise, edge direction detection is performed.

36. The system of claim 24 wherein the pattern detector determines the fidelity of refined detected direction d'.

37. The system of claim 36 wherein the pattern detector checks the fidelity of refined detected direction d' by performing Bisection pattern detection as a post-processor.

38. The system of claim 37 wherein the window width of the Bisection pattern detection is adaptive to the refined detected direction d'.

39. The system of claim 38 wherein the window constructor constructs the window W as a 2×(2K+1) window whose center pixel is at the considered missing pixel, where integer K≧0.

* * * * *